Jan. 21, 1969          C. F. CURRY ET AL          3,423,285
            TEMPERATURE CONTROL FOR A NUCLEAR REACTOR
Filed Jan. 27, 1966
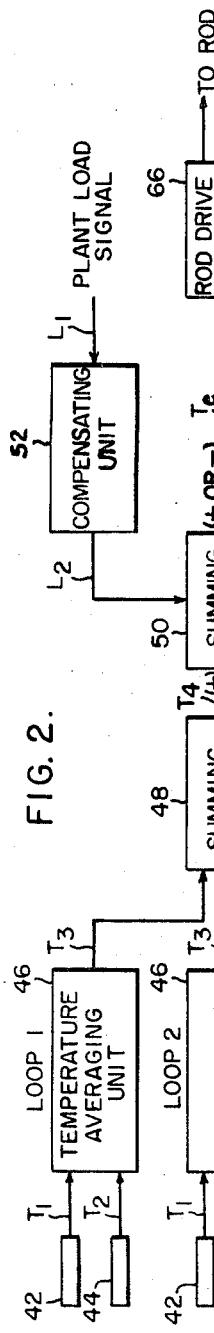
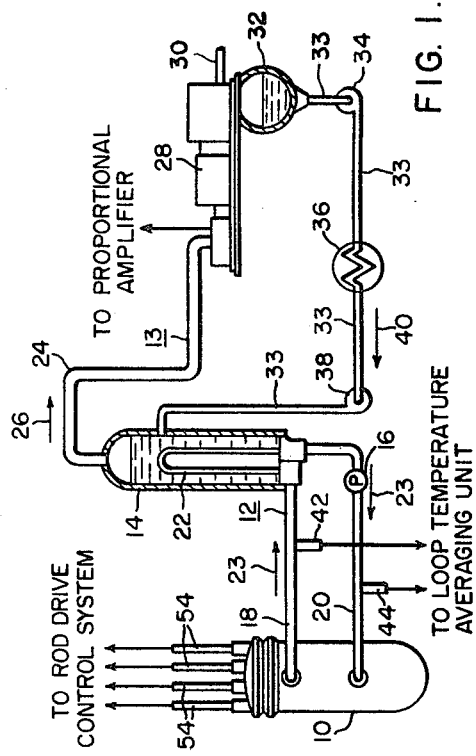

United States Patent Office 3,423,285
Patented Jan. 21, 1969

3,423,285
TEMPERATURE CONTROL FOR A NUCLEAR REACTOR
Charles F. Currey, Pittsburgh, Pa., and Roger A. Rydin, Varese, Italy, assignors to Westinghouse Electric Corporation, Pittsburgh, Pa., a corporation of Pennsylvania
Filed Jan. 27, 1966, Ser. No. 523,423
U.S. Cl. 176—24                                  6 Claims
Int. Cl. G21c 7/00; G21c 15/00

ABSTRACT OF THE DISCLOSURE

In a control system for a nuclear reactor primary coolant loop, a reference temperature signal is compared with an actual temperature signal and the reactivity of the reactor is varied in accordance with the difference in magnitude of the signals. The reference signal is provided to be of varying magnitude over a substantial portion of the heat removal range of the reactor load means.

This invention relates to temperature control of a nuclear reactor and more particularly to temperature control of a pressurized coolant reactor which is part of a nuclear reactor system having a primary loop and a secondary loop.

One type of temperature control recognized in the art is the maintenance of the coolant in the primary loop of a nuclear reactor at a constant temperature over the entire load range of a nuclear reactor. For a given nuclear reactor, such a control permits the nuclear plant full load rating to be closer to the safe operating limits of the reactor. This results from the fact that one of the limiting parameters of the reactor is the coolant temperature, as thermal-hydraulic considerations require that the permissible power output of the reactor be reduced as coolant temperature is increased. Furthermore, electrical load transients on a nuclear power plant, for example, a sudden increase in turbine generator load from say 90% to 100%, may readily result in a transient overloading of the reactor by approximately 5% in excess of the 100% rated load. With a constant average temperature control program, the coolant temperature increase is minimized during such a transient. Thus the plant full load rating can be specified closer to the safe operating limit of the reactor than for a programmed temperature type of control which normally permits an increasing temperature during such an overload. With this type of temperature control, the primary coolant temperature is independent of plant loading with the result that little or no volume change occurs in the primary coolant with changes in load. Therefore, the pressurizer coupled to the primary loop can be made relatively small, since it may be sized for transient conditions only. In addition, if the reactor has a negative temperature coefficient of reactivity an increase in primary coolant temperature due to a load drop will cause the reactor to reduce its output of power, requiring a minimum amount of control rod motion to adjust the reactor neutron flux level.

However, the disadvantage of such constant temperature control over the entire load range is that it results in a characteristic of a rising secondary loop pressure at light loads. This is caused by the fact that relatively few B.t.u.'s are transferred from the primary loop to the secondary loop at light loads. Therefore, the mean temperature differential between the tube and shell side of a vapor generator falls to a low value and causes the secondary fluid temperature to rise to a value close to that of the primary coolant temperature. This rise in secondary fluid temperature causes a corresponding rise in secondary fluid pressure. Therefore, the secondary loop must be designed for pressures much higher than the pressures encountered at the full load operating level. Obviously the requirement of the higher design pressure results in a large and undesirable increase in the capital costs of the vapor generator and other components utilized in the secondary loop.

Accordingly, it is the general object of this invention to provide a new and improved temperature control for the reactor coolant.

Another object of this invention is to modify the reactor coolant temperature in accordance with the plant load level.

Still another object of this invention is to minimize the pressure in the secondary loop.

Another object of this invention is to provide a control which not only retains those advantages achieved by maintaining a reactor coolant at constant temperature, but also minimizes the secondary system pressure.

Briefly, the present invention accomplishes the above objects by providing a control which compares the reactor coolant temperature with a variable reference temperature to produce a predetermined temperature control program for the reactor coolant. This program maintains the reactor coolant at a substantially constant temperature at the upper portion of the load range, including overload conditions, but decreases the reactor coolant temperature over the remaining portion of the load range. Therefore, the advantages of maintaining a constant reactor coolant temperature are retained for the upper portion of the load range while the pressure in the secondary loop is minimized during operation at the lower portion of the load range.

These and other objects and advantages of the present invention will become more apparent when considered in view of the following detailed description and drawings, in which:

FIGURE 1 is a schematic illustration of a nuclear reactor plant of the pressurized coolant type having primary and secondary coolant systems;

FIG. 2 is a schematic drawing of a temperature control system for the nuclear reactor plant illustrated in FIG. 1;

Figure 3:
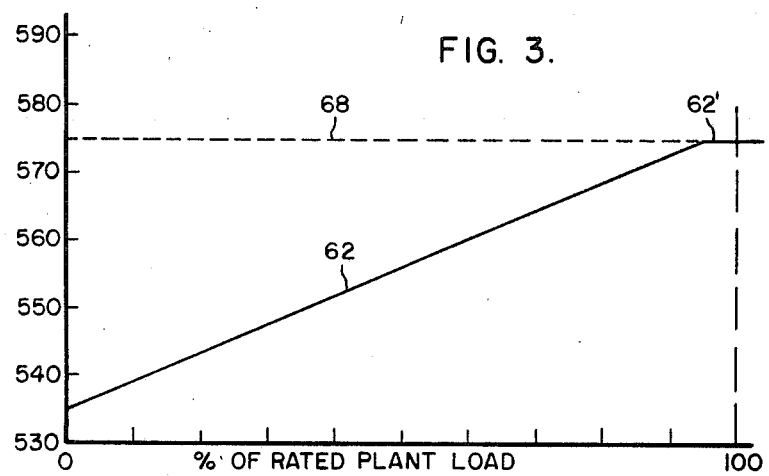
FIG. 3 is a graph comparing the reactor coolant temperature curve achieved with this invention with the constant reactor coolant temperature curve.

Referring now to FIG. 1 of the drawings, there is shown a nuclear reactor system, which comprises a reactor 10, a primary or reactor loop 12 and a secondary loop 13. In practice, reactors of this type normally include two additional primary loops (not shown). Each primary loop 12 normally includes a vapor or steam generator 14, a primary coolant pump 16, a reactor outlet conduit 18, and a reactor inlet conduit 20 all connected in series, it being understood that in a thermal circulation reactor the pump 16 is omitted. In operation, a primary coolant is heated within the reactor 10, flows from the reactor to the steam generator 14, flows through the primary or tube side 22 of the steam generator 14 where it transfers a portion of its heat to a secondary fluid. Primary coolant then flows from the steam generator 14 to the circulating pump 16, and then returns to the reactor 10 where the coolant is again heated and the cycle repeated as indicated generally by flow arrows 23. A pressurizer (not shown) is also coupled to one of the loops in order to pressurize the primary system within a predetermined design range.

A secondary ssytem fluid passes through each steam generator 14 in heat exchange relationship with the primary coolant where it is heated and converted to vapor or steam. The vapor flows through a steam conduit 24 as denoted by flow arrow 26 to a turbine 28 which is connected by a shaft 30 to a load, for example, an electric generator. The steam after passing through the turbine 28 is condensed in a condenser 32. The condensate or water thus formed is returned to the secondary or shell side of each steam generator 14 through conduits 33, condensate pump 34, feedwater heater 36, and feedwater pump 38 as denoted by flow arrow 40. The aforementioned flow cycle for the secondary fluid is referred to herein as a secondary loop 41.

Referring now to FIG. 2, the coolant temperatures in reactor outlet conduit 18 and reactor inlet conduit 20 for each of the three primary loops is sensed by temperature measuring elements 42 and 44, respectively, each of which may comprise a thermocouple or resistance bulb. The temperature measuring elements 42 and 44 produce output signals $T_1$ and $T_2$, respectively, representative of the instantaneous temperature. The $T_1$ and $T_2$ signals for each loop are applied to a temperature averaging unit 46, which may be a resistance to current or resistance to voltage converter if electrical signals are used. Each temperature averaging unit 46 produces an output signal $T_3$ which is representative of the average temperature of each primary loop. The signal $T_3$ from each loop is then applied to a summing amplifier 48, which then produces a single output signal $T_4$ which is representative of the average coolant temperature for all three loops. It is understood that if only a single loop is used, the summing amplifier 48 may be eliminated or merely an amplifying unit may be used. The output signal $T_4$ is then applied to a summing unit 50 which also receives other signals to be described hereinafter.

A plant load signal $L_1$ is applied to a compensating unit 52. The plant load signal $L_1$ is obtained from any one or combination of sources, for example, from a vapor flow rate monitor of the neutron flux measuring means, the vapor pressure measuring means located downstream of the turbine control valves in the turbine 28, and/or a means for measuring the electrical output from the electric generator (not shown). The compensating unit 52 is formed by means known in the art to determine the rate of load change and produces an output signal $L_2$ which is applied to the summing unit 50. The signal $L_2$ is utilized to provide anticipatory motion of control rods 54 (FIG. 1) in response to load changes.

The plant load signal $L_1$ is also applied to a proportional amplifier 56. The proportional amplifier 56 is formed to amplify the signal $L_1$ and to produce a reference signal $S_r$ which is directly proportional to the plant load, as shown by curve 58. The signal $S_r$ is then applied to a high limiter 60 of conventional construction which alters the signal $S_r$ by cutting off the signal $S_r$ at a predetermined level in the upper portion of the load range so as to produce a reference signal $T_r$ which follows a curve 62. Thus the signal $T_r$ is provided with a flattened portion 64 corresponding to the upper portion of the load range but remains the same as signal $S_r$ over the remaining portion of the load range including overloads. The signal $T_r$ is then applied to the summing unit 50.

The signals $L_2$ and $T_4$ are algebraically added in the summing unit 50, and the resultant is compared with reference signal $T_r$ to produce an error signal $T_e$. The error signal $T_e$ is then aplied to a rod drive control system 66. The rod drive control system is formed to energize the control rod drives 54 (FIG. 1) to move the control rods (not shown), which are coupled thereto to, into or out of the reactor 10 depending on the error signal $T_e$ received by the rod drive control system 66. The magnitude and direction (+ or —) of the error signal $T_e$ determines the amount and direction of movement of the control rods.

As known by those skilled in the art, the aforementioned circuits are provided as required with feedback signals and with leads and lags as required to adapt this invention to the specific parameters of the reactor system, and to obtain optimum response of the reactor system to the control system.

Referring now to FIG. 3, there is shown a dotted line curve 68 which illustrates that one possible procedure for presurized water plants is to maintain the reactor coolant average temperature at a value, in this example, of 575° F. throughout the entire load range of the plant including overload conditions. Also shown in FIG. 3 is solid line curve 62, as previously explained in connection with FIG. 2 and with reference signal $T_r$. Curve 62 illustrates an example of how the reactor coolant average temperature can be varied with plant load. In this example the coolant average temperature for each reactor loop is varied from 535° F. to 575° F. over a load range from 0 to 95%. Curve 62 also shows that above the 95% load point of the curve the coolant average temperature for all three loops is maintained constantly at its maximum level (575° F.) and includes the overload conditions above 100%.

Assuming now that the reactor coolant average temperature for each primary loop is 570° F. at approximately 85% of rated plant load and in a steady state condition, the plant load signal $L_1$ applied to proportional amplifier 56 produces an output signal $S_r$ which represents a coolant average temperature of 570° F. Since this signal is below the maximum temperature limit, the high limiter 60 allows the signal $S_r$ to pass through unaltered as reference signal $T_r$. Signal $T_r$ forms one input to summing unit 50 and output signal $T_4$ of summing amplifier 48 is the other input signal to summing unit 50. Summing unit 50 may comprise one of many commercially available devices which algebraically add two inputs to produce an output corresponding to the sum of the inputs. In this example, summing unit 50 compares output signal $T_4$ with reference signal $T_r$ and produces error signal $T_e$ having a value of zero, as there is no difference between the signal $T_4$ and the signal $T_r$ under the conditions of this example. Therefore, the rod drive control system maintains the control rods in a fixed position. Assuming now that the plant load rises to 95%, the plant load signal $L_1$ applied to the proportional amplifier 56 increases the signal $S_r$ so as to represent 575° F. which is the desired reactor coolant average temperature at 95% load. The high limiter 60 then allows signal $S_r$ to pass through unaltered as reference signal $T_r$. Signal $T_r$ representing 575° F. is then compared with signal $T_4$ representing 570° F. in the summing unit 50. The summing unit 50 produces output error signal $T_e$, as the signals $T_4$ and $T_r$ do not match. The error $T_e$ has a sufficient value when applied to the rod drive control system 66 to actuate the withdrawal of the control rods from reactor 10 an amount sufficient to increase the coolant average temperature for each loop to 575° F. When the reactor coolant average temperature for each loop reaches 575° F., the signal $T_4$ now matches the reference signal $T_r$ erasing the error signal $T_e$ maintaining the control rods in their newly withdrawn position.

If the plant load rises above 95%, the proportional amplifier 56 produces a signal $S_r$ which represents a reactor coolant average temperature greater than 575° F., as the proportional amplifier 56 produces an output signal $S_r$ which is directly proportional to the plant load. In this case the high limiter 60 limits the signal $S_r$ to that magnitude corresponding to 575° F. Therefore, reference signal $T_r$ is maintained at a constant value representing 575° F. for any load above 95% including overloads above 100% of rated load.

It is understood that a reverse procedure occurs when the plant load is reduced. For example, if the plant load is reduced from 95% to 85%, the error signal $T_e$ produced by the summing unit 50 is in a direction that causes the rod drive control system 66 to act upon the control rod drives 54 in a manner to insert the control rods into the reactor 10, which lowers the power output of the reactor 10 thereby reducing the reactor coolant average temperature from 575° F. to 570° F. It is also understood that the individual components in the circuitry illustrated in FIG. 2 are well known in the art.

Figure 4:
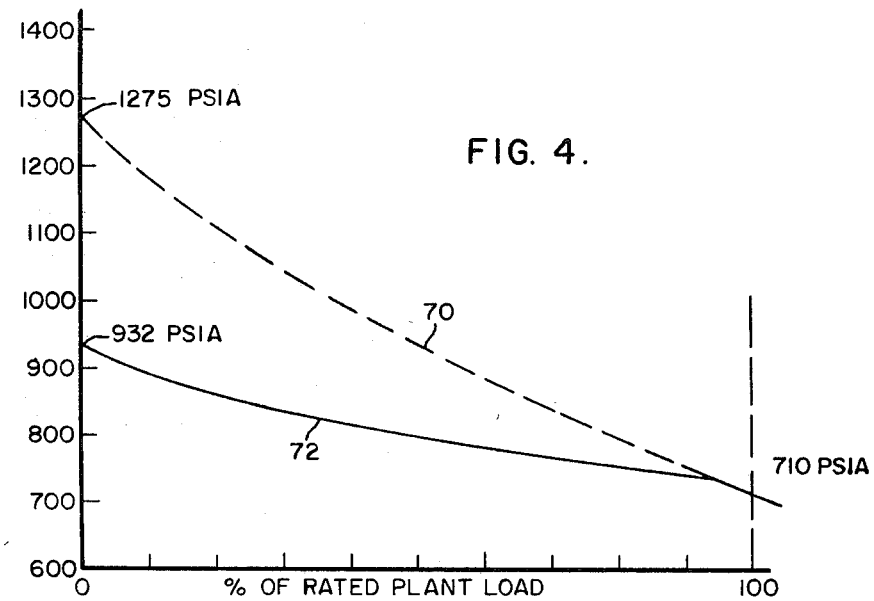
FIG. 4 is a graph comparing the secondary loop pressure for the temperature curve achieved with this invention with the secondary loop pressure for the constant temperature curve.

Referring now to FIG. 4, there is provided a graph plotting the secondary or steam pressure versus rated load for both the constant temperature control system of the prior art and the programmed control system of this invention. Dotted line curve 70 illustrates the steam pressure rise as the plant load is reduced from 100% to zero percent and for a constant temperature control system, while solid line curve 72 illustrates steam pressure over the plant load range for a programmed temperature control of this invention. FIG. 4 clearly illustrates that the secondary system pressure is materially lower over substantially the entire load range when the programmed control system of this invention (curve 72) is employed than the secondary side pressures obtained with the constant temperature control (curve 70). The lower pressures are particularly evident at the lower end of the load range. Accordingly, the reactor secondary system can be constructed to accommodate a lower design pressure when the control system of this invention is employed. Utilizing the numerical values of FIG. 4, the vapor generator and components utilized in the secondary system can be designed including the proper margins to prevent maloperation or weeping of safety valves, for 1,000 p.s.i.a. with the programmed reactor coolant average temperature control of this invention; whereas, the same components in the secondary side must accommodate, including proper margins, a minimum of approximately 1,400 p.s.i.a. when the constant average temperature control of the prior art is employed. Furthermore, the capital costs of a nuclear reactor plant usually are higher (but much lower fuel costs) than a power plant burning conventional fuels such as coal or oil. Therefore, to operate economically a nuclear plant is usually a base load plant and normally operates at approximately full load. By maintaining the reactor coolant average temperature constant from, for example 95% of the rated load and above, the desirable characteristics of a constant reactor coolant average temperature are achieved by the control system of this invention, but the undesirable characteristics thereof at light loads are avoided.

If desired, curve 62 in FIG. 3 may be modified in accordance with the invention to maintain the reactor coolant average temperature at a constant value over a greater plant load range, for example from about 50% of the rated load and above. In this instance the constant temperature segment 62' of curve 62 would coincide with curve 68 for the load range between 50% load and 100% load (including overload), while the slope of the remainder of curve 62 would become steeper so as to intersect with segment 62' at the point thereon corresponding to 50% load. To steepen the remainder of curve 62 as described, the reactor coolant average temperature is reduced to a level of, for example, 535° F. and the upper limit is maintained at, for example, 575° F. Thus, many modifications within the contemplation of this invention may be made to curve 62 as long as the maximum secondary pressure is maintained lower than the design secondary pressure (including safety margins) attained at zero load.

The circuitry illustrated in FIG. 2 can also be modified so as to measure only the temperature of the reactor coolant inlet temperature and then comparing the reactor coolant inlet temperature with an appropriate reference signal $T_r$. Similarly, a signal corresponding to the reactor coolant outlet temperature reactor can be compared with an appropriate reference signal $T_r$. However, in both aforementioned cases the reference curve used with the reactor coolant inlet temperature or the reactor coolant outlet temperature would be programmed in a manner similar to that illustrated by curve 62, except that the new reference curve would be proportionately lower over the entire load range when compared with the reactor coolant inlet temperature and would be proportionately higher over the entire load range when compared with the reactor coolant outlet temperature.

If it is desired to place the nuclear reactor plant on manual control at the lower end of the load range for example between zero and 20%, the slope of the curve 62 in FIG. 3 can be made steeper so as to reach a reactor coolant average temperature of for example 535° F. at 20% of the rated plant load. The reactor coolant average temperature can then be manually regulated as desired for the load range between zero and 20% of rated plant load.

Since numerous additional changes may be made in the control system described herein and different embodiments of the invention may be made without departing from the broad spirit thereof, it is intended that all matter contained in the foregoing description or shown in the accompanying drawings shall be interpreted as illustrative and not in a limiting sense.

What is claimed as new is:

1. In a nuclear reactor system having at least one reactor primary coolant loop and a reactivity controlled reactor, a secondary coolant loop positioned in heat exchange relationship with said primary coolant loop, means for maintaining said primary loop at a predetermined pressure level, means for varying the reactivity in said reactor to vary the temperature of the coolant in said primary loop and both the temperature and pressure of the coolant in said secondary loop, load means in said secondary loop for removing varying amounts of heat from the coolant in said secondary loop, first signal generating means producing a first signal representative of the actual temperature of the coolant in said primary coolant loop, plant load signal means, reference signal generating means cooperating with only said plant load signal means for generating a reference signal corresponding to the temperature desired in said primary loop, comparing means for comparing said first and said reference signals and producing a difference signal, means responsive to the magnitude of said difference signal for varying the reactivity of said reactor to nullify said difference signal, and said reference signal generating means producing said reference signal of varying magnitude over at least a substantial portion of the heat removal range of said load means.

2. The combination of claim 1 wherein the reference signal generating means produces a reference signal which causes a reduction in the primary loop coolant temperature as the load is reduced whereby a pressure rise in said secondary loop is minimized.

3. The combination of claim 1 wherein said load range portion is less than the entire load range and wherein said load reference signal generating means produces said load reference signal which increases substantially proportional to load increases only over said load range portion.

4. The combination of claim 3 wherein said load reference signal generating means produces a maximum load reference signal at that extremity of said load range portion corresponding to the maximum load in said load range portion, said last mentioned maximum load being less than the maximum load in the remainder of said load range and wherein said generating means produces a reference signal which is substantially constant with load changes over at least a portion of said remainder of the load range.

5. The combination of claim 1 wherein said reactor includes a core having a coolant inlet and a coolant outlet and wherein said first signal comprises one of the average of the reactor coolant outlet temperature and the reactor coolant inlet temperature, the average reactor coolant outlet temperature and the average reactor coolant inlet temperature.

6. The combination of claim 4 wherein the load range extremity lies at approximately 50% of a rated load portion of the total load range.

References Cited

UNITED STATES PATENTS

| | | | |
|---|---|---|---|
| 3,061,533 | 10/1962 | Shannon et al. | 176—20 X |
| 3,253,994 | 5/1966 | Kagi | 176—20 |
| 3,255,084 | 6/1966 | Doroszlai | 176—20 |

OTHER REFERENCES

M. A. Schultz, Control of Nuclear Reactors and Power Plants, McGraw-Hill Book Co., New York, N.Y. 1961, pp 307, 308 and 309.

REUBEN EPSTEIN, *Primary Examiner.*

U.S. Cl. X.R.

176—20